Dec. 15, 1931.    W. A. HAMMOND    1,836,592
AIRPLANE
Filed March 31, 1930    2 Sheets-Sheet 1
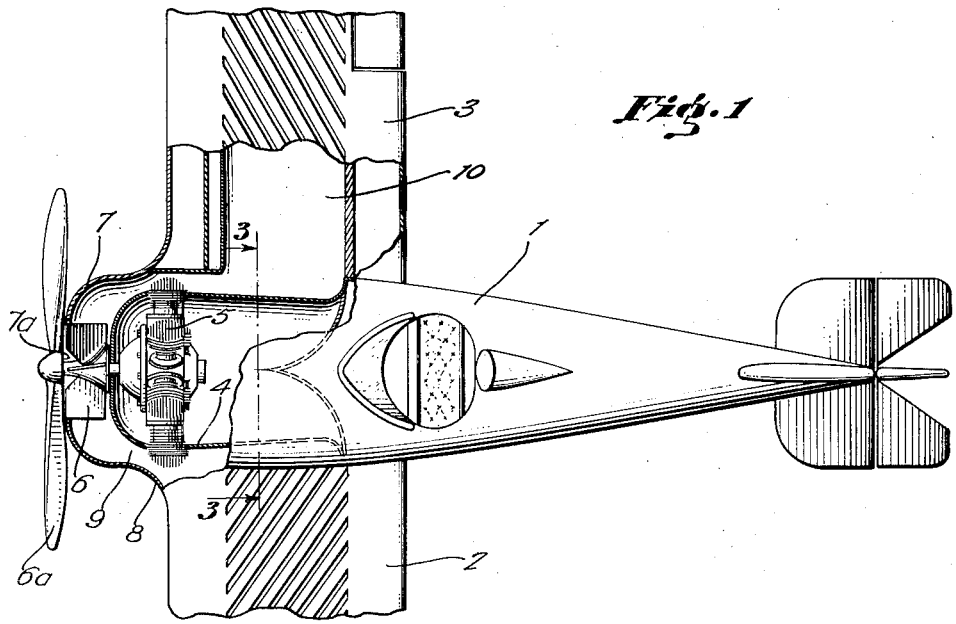
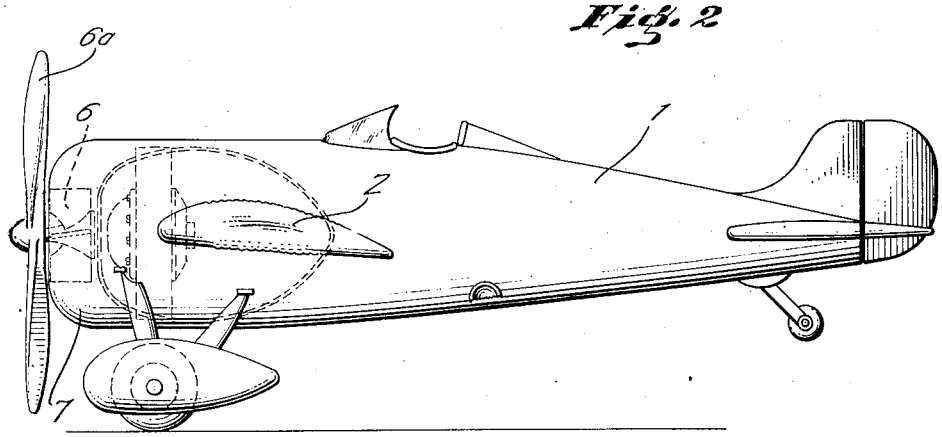
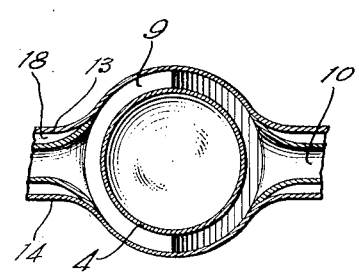
INVENTOR
Wilbur A. Hammond.
BY Lyon & Lyon
Attys Dec. 15, 1931. W. A. HAMMOND 1,836,592
AIRPLANE
Filed March 31, 1930  2 Sheets-Sheet 2
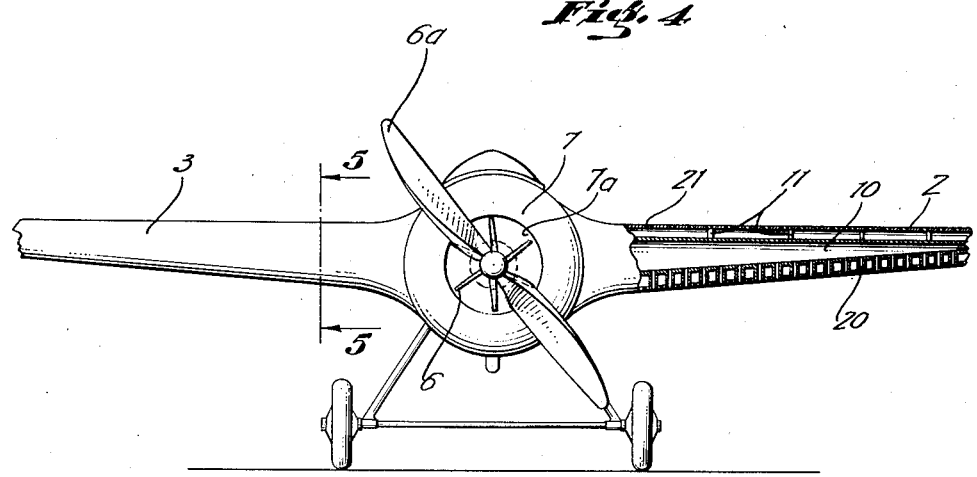
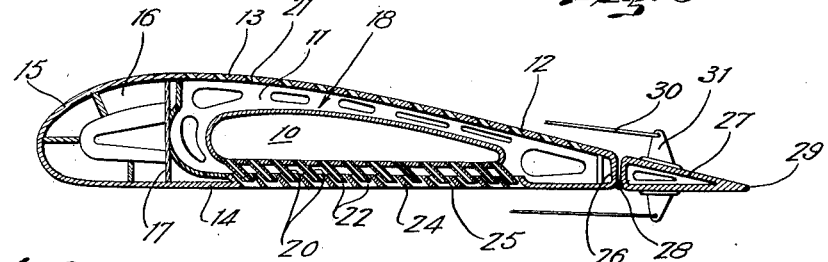
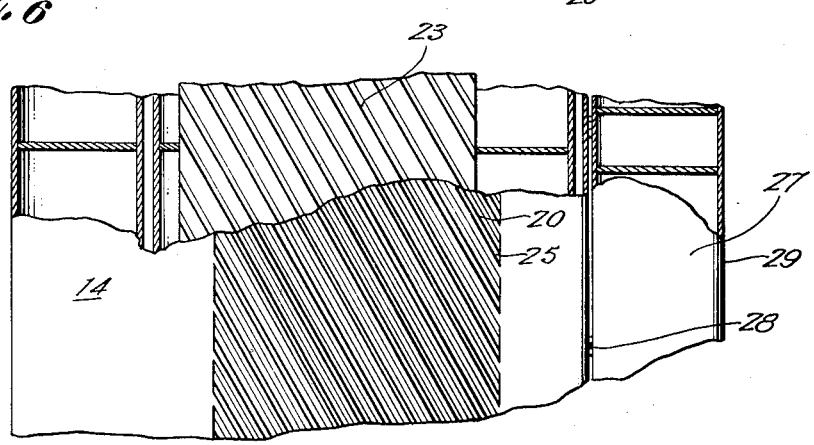
INVENTOR
Wilbur A. Hammond.
BY
Lyon+Lyon
Att'ys.

Patented Dec. 15, 1931

1,836,592

UNITED STATES PATENT OFFICE

WILBUR A. HAMMOND, OF LOS ANGELES, CALIFORNIA

AIRPLANE

Application filed March 31, 1930. Serial No. 440,286.

This invention relates to airships and while the invention may be practiced with airships of any type, it is particularly applicable to airships of the airplane type. One of the difficulties in connection with the operation of airplanes is that they cannot readily be landed at low speeds and it would be desirable to provide means for increasing the buoyancy of such ships when landing or taking off. It is also a fact that the largest portion of the lifting power of an airplane is due to the formation of a partial vacuum on the upper surface of the wing as it goes through the air.

A general object of this invention is to overcome the difficulty referred to above and to provide means for increasing the buoyancy of an airship in flight and while landing; also to provide means which in operation tends to increase the development of the partial vacuum referred to and which is formed above the wing as it moves through the air. Also to provide means for developing suction on the upper surface of a wing thereby giving a perceptible increase in angle of attack at which airplanes can climb without stalling which results in greater lift and increased safety.

Further objects of the invention will appear hereinafter.

The invention consists in the novel parts and combinations of parts to be described hereinafter, all of which contribute to produce an efficient airplane.

A preferred embodiment of the invention is described in the following specification, while the broad scope of the invention is pointed out in the appended claims.

In the drawings Figure 1 is a plan of the metal portion of an airplane embodying my invention with the outer portions of the wings broken away and showing portions of the ship in section.

Figure 2 is a side elevation of the airplane shown in Figure 1 and representing the same with the tail of the fuselage raised as in taking off.

Figure 3 is a vertical section taken about on the line 3—3 of Fig. 1, and particularly illustrating the construction of the body of the airship at the junction with the wings; in this view the outer portions of the wings are broken away.

Figure 4 is a front elevation of the airplane with one of the wings broken away and shown in longitudinal section; that is, on a line parallel to the lateral axis of the airplane.

Figure 5 is a cross-section through the wing taken about on the line 5—5 of Figure 4.

Figure 6 is a bottom plane of the wing shown in Figure 5, certain parts being broken away and shown in section.

Before proceeding to a detailed description of the embodiment of the invention illustrated, it should be stated that in practicing the invention, I provide means for projecting air currents in a downward direction on the underside of the airship and in doing so the currents of air projected at this point entrain air from an inner chamber in the wing of the airship. On the upper surface of the wing inlet openings for the air to be entrained are provided, thereby increasing the already existing partial vacuum on the upper face of the wing. While the air currents can if desired be projected vertically downward, I prefer to project them downwardly in an inclined direction toward the rear. This enables the air stream flowing past the underside of the airship to assist the action of the projected air streams and furthermore the reaction from these projected air currents tends to give a certain forward propelling effect and buoying effect.

I shall now proceed to describe the invention as applied to an airplane although, if desired, the invention can be applied to ships that are lighter than air for increasing their buoyancy.

Referring more particularly to the parts and especially to Figs. 1 and 2, the airplane illustrated includes a fuselage 1 near the forward end of which an airfoil is provided comprising two laterally projecting wing sections 2 and 3 producing an airplane of monoplane type. The forward end of the fuselage is formed into an engine housing 4 in which an engine 5 is located, the shaft of which projects forwardly and carries an impeller 6 and/or a propeller 6a. The impeller 6 is located in an opening 7a (see Fig. 4) disposed at the forward end of the fuselage and formed in a forwardly projecting nose 7 formed in the outer housing 8 that covers this part of the fuselage. This impeller 6 is in the form of a blower having substantially radial blades that receive the air and force it outwardly into an annular duct 9 that is formed between the engine housing 4 and the hood or nose 7. In this way the air that is taken in through the opening 7a is forced backwardly through the annular duct 9, and toward the rear end the air passes into a longitudinal duct 10 located in each wing (see Fig. 5). These ducts have substantially the same shape of section as the wing, and this cross-section is gradually reduced in its vertical dimensions from the fuselage toward the tips of the wings, being suitably braced at points along the length by means of skeleton trusses 11 of conventional rib type (see Fig. 4). Each duct 10 is located in the interior of an outer shell 12 that provides the outer portion or surface of the wing including an upper wall 13 and a lower wall 14. The upper wall 13 is laid out with any desired approved form employed in airplane wing construction, and is preferably substantially as shown in Fig. 5 so that the forward end 15 of the wing presents a rounded nose with the greatest depth of the wing located near its forward edge at the front spar.

The forward portion of the wing may be boxed off into a closed chamber 16 by means of a vertical partition or bulkhead 17 that extends longitudinally with the wing. Aft of this bulkhead 17 the space within the outer shell forms an air chamber 18.

From the bottom wall 19 of each duct 10 a plurality of tuyères or nozzles 20 extend downwardly and rearwardly so that at their tips terminal outlets are formed that project the air through corresponding openings 22 that surround them, said openings 22 being formed in the lower face of the outer shell of the wing. These outlet nozzles have openings that deliver air currents from the air ducts 20 downwardly and rearwardly. As the air current passes outwardly at the openings 21 it entrains air in the air chamber 18. The air within the air chamber 18 is constantly replenished by air that is drawn into the chamber on its upper side through air inlet openings 21 (see Fig. 5). These inlet openings preferably incline downwardly toward the rear. The openings through the tuyères 20 are preferably in the form of slots 23 that are inclined rearwardly toward the outer portions of the wings.

The underface 14 of the outer shell of the wing is provided with a plurality of slats or battens 24 which extend parallel with these tuyères and are disposed apart so that longitudinal openings 25 are formed on the front and rear sides of the tuyères through which the air in the air chamber is entrained when the air currents are flowing outwardly through the tuyères.

If desired, the rear end of the wing may terminate in a vertical shoulder 26 extending over all or any part of its span, at which point an aileron 27 may be secured to swing on an axis 28. This aileron tapers longitudinally toward a relatively sharp rear edge 29 and when in its normal position it completes the outline of the wing (see Fig. 5). This aileron may extend along the entire rear edge of the wing or if desired may be located only at the tips of the wings. It is provided with suitable control cords 30 attached to bracket arms 31.

In the operation of the airplane free air is drawn through the opening 7a at the forward end of the nose 7, and this air is forced rearwardly at a high velocity through the annular duct 9 at the rear of which it passes laterally into the lateral ducts 10 that extend out into the wings 2 and 3. In this way air is forced outwardly at high velocity in the ducts 10 from which it is discharged through the inclined tuyères 20 (see Fig. 5), in a downward direction and through the underface 14 of the outer shell of the wing.

In passing out, these air currents entrain air through the openings 21 which air is withdrawn from the air chamber 18 between the inner and outer shells of the wings. Withdrawing the air from the air chamber 18 in this way causes an inrush of free air on the upper side of the wing through the inlet openings 22. This increases the partial vacuum which is naturally formed on the upper side of a wing of this type and increases the buoyancy of the wing derived from this reduction in pressure on its upper face.

The reaction from the downwardly projected air currents flowing through the tuyères 20 operates to give the airship buoyancy and will propel it ahead. While sufficient propelling effect is derived from a blower fan of the type illustrated, if desired this improvement may be employed as an adjunct for an airplane having a propeller at the forward end forward of the blower 6. In other words, I may extend the blower shaft forwardly and provide an ordinary airplane screw propeller at that point.

While I have illustrated my invention as applied to a monoplane, it should be understood that I can apply the invention with the same facility to a biplane, multiplane, or any other type of airship.

It is understood that the embodiment of the invention described herein is only one of the many embodiments this invention may take, and I do not wish to be limited in the practice of the invention, nor in the claims, to the particular embodiment set forth.

What I claim is:

1. An airship having a wing with an undersurface having openings therein and an upper surface having openings therein with means for producing downwardly directed air currents through the lower openings, said wing having a chamber with means for entraining air from the same by the said currents of air, thereby drawing air into the wing through the upper openings to increase the lift.

2. An airship having a wing with an inner duct extending longitudinally therein and having outlets on the undersurface of the wing, said wing having an air chamber surrounding the said duct, and having air inlet openings through the upper wall of the wing, and means for forcing the air from the said duct downwardly through said outlets, said air chamber having outlets adjacent said first-named outlets cooperating with the same to entrain air from the air chamber and causing an influx of air through the inlet openings in the upper wall of the wing.

3. An airship constructed as described in claim 1 in which the openings on the underside of the wing are in the form of slots.

4. An airship having the construction described in claim 1 in which the openings on the underside of the wing are in the form of elongated outlets extending in an inclined direction with respect to the fore-and-aft line of the ship.

5. An airship constructed as described in claim 1 in which the openings in the lower side of the wing are constructed with downwardly directed nozzles for delivering the air currents downwardly and rearwardly, and the underwall of the air chamber is provided with outlets adjacent the nozzles and effecting efflux of entrained air from the air chamber by the air currents passing down through the nozzles.

6. An airship constructed as described in claim 1 in which the openings on the underside of the wing are in the form of slots extending in an inclined direction with the outer ends of the slots disposed aft of the inner ends.

7. An airship having a wing with an undersurface having outlet openings therein and having an upper surface with inlet openings therein, means on the underside of the airship including a plurality of air delivery terminals located at said outlet openings, means for forcing air downwardly through said terminal openings operating to entrain air downwardly through said lower openings and causing an influx of air through the inlet openings.

8. An airship having a wing with an air impeller disposed toward the forward edge of the wing, said wing having a duct extending longitudinally of the same receiving air from the said impeller, said wing having an air space surrounding said duct and having air inlet openings on its upper side to admit air to the air space, said wing further having a plurality of outlet openings on its underside and a plurality of delivery nozzles for delivering air from the said duct downwardly through the said outlet openings and operating to entrain air from the said air space and cause an influx of air through the inlet openings on the upper side of the wing.

9. An airship having a fuselage with a wing extending laterally from each side of the fuselage, an air impeller mounted at the forward end of the fuselage to rotate on a substantially horizontal axis, each of said wings having an air duct extending longitudinally of the same, with means for guiding air impelled by said impeller into said ducts, each of said wings having an air space surrounding its duct and having outlet openings from the air space on the underside of the wings, and a plurality of air outlets from the duct for delivering the impelled air downwardly through the said outlet openings and thereby entraining air through the same from the air space, each wing having inlet openings into said air space on the upper face of the wing in which an influx of air is induced and operating to increase the bouyancy of the airship.

10. An airship constructed as described in claim 1 in which the openings in the underside of the wing are elongated and extend in a general lateral direction with respect to the fore-and-aft line of the ship.

Signed at Los Angeles, Calif., this 4th day of March, 1930.

WILBUR A. HAMMOND.